(12) United States Patent
Buer

(10) Patent No.: US 6,553,496 B1
(45) Date of Patent: Apr. 22, 2003

(54) INTEGRATION OF SECURITY MODULES ON AN INTEGRATED CIRCUIT

(75) Inventor: Mark Leonard Buer, Gilbert, AZ (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/241,176

(22) Filed: Feb. 1, 1999

(51) Int. Cl.[7] .................................................. G06F 1/00
(52) U.S. Cl. ....................... 713/200; 713/202; 713/300; 713/323; 713/340; 702/64; 702/190; 714/10; 714/47; 714/55; 714/22; 327/18; 327/39
(58) Field of Search ................................ 713/200, 202, 713/100, 300, 323, 340; 702/64, 190; 714/10, 47, 55, 22; 327/18, 39, 43, 47, 49, 94, 143, 189, 509, 546

(56) References Cited

U.S. PATENT DOCUMENTS

| | | | | |
|---|---|---|---|---|
| 4,849,614 A | * | 7/1989 | Watanabe et al. ........... 235/379 |
| 5,107,139 A | * | 4/1992 | Houston et al. ............... 327/18 |
| 5,502,812 A | * | 3/1996 | Leyre et al. ................... 714/10 |
| 5,606,511 A | * | 2/1997 | Yach .......................... 702/190 |
| 5,898,711 A |   | 4/1999 | Buer |
| 6,114,880 A | * | 9/2000 | Buer et al. .................... 327/39 |
| 6,188,257 B1 | * | 2/2001 | Buer ........................... 326/94 |

FOREIGN PATENT DOCUMENTS

| EP | WO 94/13080 | 6/1994 |
| EP | WO 96/000953 | 1/1996 |
| EP | WO 98/47060 | 10/1998 |

* cited by examiner

*Primary Examiner*—Ly V. Hua
(74) *Attorney, Agent, or Firm*—Peter Zawilski

(57) ABSTRACT

An integrated circuit includes secure logic that requires protection. Secure assurance logic protects the secure logic. The secure assurance logic includes a plurality of protection modules that monitor the occurrence of insecure conditions. Each protection module monitors a different type of insecure condition. Each protection module asserts an alarm signal when an associated insecure condition is detected. The alarm signals asserted by the plurality of protection modules are stored.

20 Claims, 6 Drawing Sheets

INTEGRATION OF SECURITY MODULES ON AN INTEGRATED CIRCUIT

RELATED APPLICATION

The subject matter of the present patent application is related to the subject matter set out by the same inventor (Mark Leonard Buer) in a copending patent application Ser. No. 09/231,175, filed on the same date as this patent application, for POWER-ON-RESET LOGIC WITH SECURE POWER DOWN CAPABILITY, assigned to the same assignee.

BACKGROUND

The present invention concerns security protection within an integrated circuit design and pertains particularly to integration of security modules on an integrated circuit.

For some processing applications, it is essential to operate in a secure environment so that operations cannot be probed or altered. In the prior art, various methods have been used to provide for a secure processing environment.

For example, a mechanical chassis can be used to house processing equipment. This mechanical chassis can include tamper switches and other elements to detect and protect against tampering and alterations. Unfortunately, such a mechanical chassis can add a significant amount of expense to a product.

Alternatively, in order to restrict access to particular integrated circuits, the integrated circuits can be covered with epoxy or other chemical materials to hinder access. Unfortunately, often this can be easily defeated and so provides only a nominal amount of protection.

Another method to provide for a secure processing environment is to implement the system on a single integrated circuit. A portion of the integrated circuit, for example, can be used to perform secure operations. However, there may still be attempts to defeat this arrangement.

For example, an attacker may attempt to expose information about a security key or information about a security system by applying radiation or alpha particles in the proper location. The excess radiation or alpha particles can result in a single event upset (SEU). The single event upset can affect the data integrity of a secure operation. If the single event upset occurs in an operation related to a security key or data encrypted with the security key, this may weaken the effectiveness of the protection within the integrated circuit and perhaps provide an avenue to break the security system.

Other types of attacks can be perpetrated as well. While there have been various types of circuitry added to protect an integrated circuit, these have usually been added on an ad hoc basis. There has been no integrated effort to protect integrated circuits.

SUMMARY OF THE INVENTION

In accordance with the preferred embodiment of the present invention, an integrated circuit includes secure logic that requires protection. Secure assurance logic protects the secure logic. The secure assurance logic includes a plurality of protection modules that monitor the occurrence of insecure conditions. Each protection module monitors a different type of insecure condition. Each protection module asserts an alarm signal when an associated insecure condition is detected. The alarm signals asserted by the plurality of protection modules are stored.

In the preferred embodiment, once an alarm signal is asserted, the alarm signal is received by a first register. A second register is used for masking the alarm signals. The masking performed by the second register is used to prevent selected alarm signals from being propagated. This allows certain alarms to be blocked during testing of the secure assurance logic. A third register stores the alarm signals that have been asserted but have not been masked by the second register. The integrated circuit can be reset when an alarm signal is detected.

The plurality of protection monitors include, for example one or more of the following: a high frequency monitor that detects when a monitored clock exceeds a predetermined frequency, a low frequency monitor that detects when a monitored clock is less than a predetermined frequency, a single event detector monitor that monitors single event upsets within the integrated circuit, a reset monitor that monitors an amount of times the integrated circuit is reset, and a voltage detector that monitors for invalid voltage levels.

In addition, the secure assurance logic generally includes a power-on-reset circuit for resetting the integrated circuit to a known state upon power-up of the integrated circuit.

The above-described integration of the protection modules into secure assurance logic requires that someone attacking the security features of the integrated circuit must simultaneously defeat more than one security component. This increases the complexity of the attack required to successfully circumvent the security features. The integrated solution described herein can be used to protect integrated circuits that implement firmware that must access two independent address spaces. The programmable features of secure assurance logic also allows register values to be changed separately such that there is no insecure period of overlap in the operation of the integrated circuit.

DESCRIPTION OF THE PREFERRED EMBODIMENT

Figure 1:
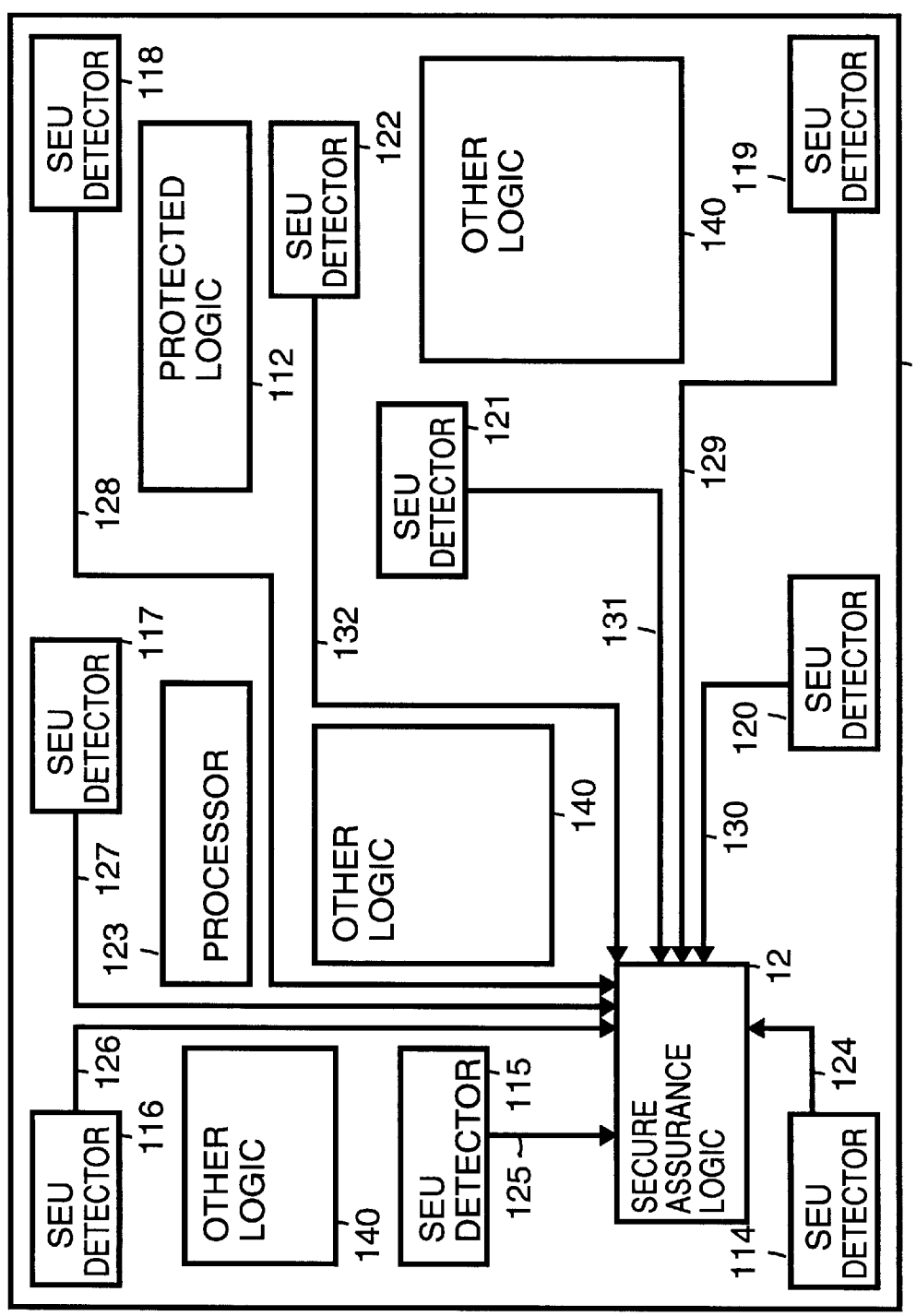
FIG. 1 is a simplified block diagram that shows an integrated circuit within which secure assurance logic is used to guard protected logic in accordance with a preferred embodiment of the present invention.

FIG. 1 is a simplified block diagram of an integrated circuit 11 that includes a processor 123, protected logic 112 and other logic 140. Secure assurance logic 12 links together electrical protection within integrated circuit 11. The integration of all secure assurance logic 12 components into a single modular protected block allows processor 123 to control and observe the protection modules for testing without affecting the security of integrated circuit 11. By coupling multiple protection modules together, the security of the system is improved since the protection modules now work together. Additionally reset states for the protection modules can be controlled such that power down for IDDq testing does not defeat the security of the integrated circuit.

Figure 2:
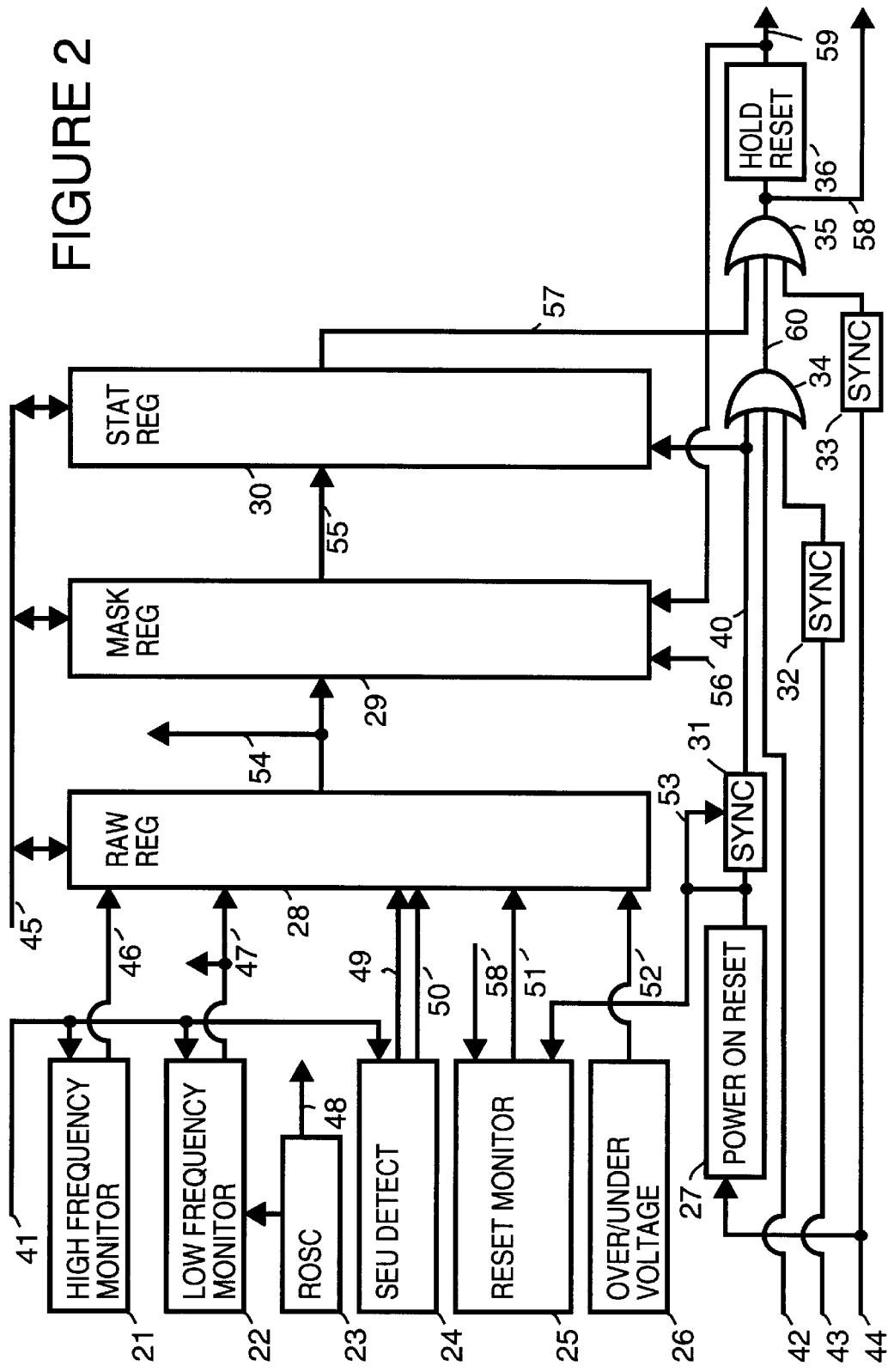
FIG. 2 is a simplified block diagram that shows secure assurance logic that links together electrical protection within an integrated circuit in accordance with a preferred embodiment of the present invention.

FIG. 2 is a simplified block diagram of secure assurance logic 12. A monitored clock signal (MON_CLK) is placed on a monitor clock signal line 41. Components within secure assurance logic 12 monitor and protect the monitored clock. A mask register 29 is used to allow masking of particular security assurance features so that individual security features (i.e., alarm signals) can be turned off for certain operations via processor 123. This also allows each of the features to be tested. Since there are duplicated security features in integrated circuit 11, the assurance logic can be tested at startup without causing a problem and without allowing an opening for an attacker.

Secure assurance logic 12 includes a high frequency monitor 21, a low frequency monitor 22, a single event upset (SEU) detect monitor 24, a reset monitor 25, and an over/under voltage monitor 26.

Alarms from the monitoring modules are integrated using a raw register 28, mask register 29 and a status register 30. Processor 123, using a bus 45 can read and write information to raw register 28, mask register 29 and status register 30.

Raw alarm sources are trapped asynchronously in raw register 28. The alarms are output on alarm lines 54. The alarms are masked by values in mask register 29 prior to being forwarded to status register 30. The masked alarms are forwarded to status registers 30 on lines 55. The asynchronous trap is required since a valid clock source cannot be guaranteed at the time of the alarm. The asynchronous trap is double synchronized to the clock domain of processor 123 and then sampled by status register 30. Once a bit in the status register is set, the corresponding asynchronous trap is cleared. An alarm set in status register 30 results in a reset signal being placed on a line 57.

Figure 4:
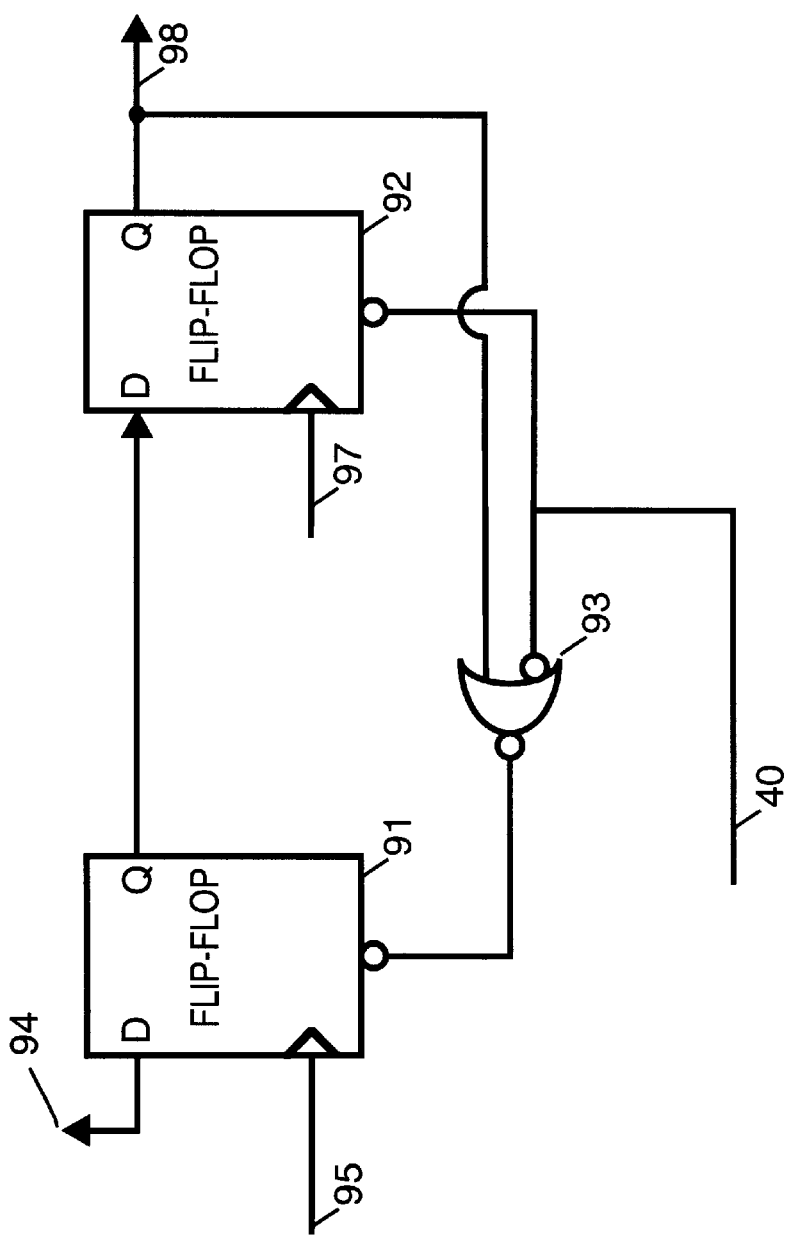
FIG. 4 is a simplified block diagram that shows structure of a status register shown in FIG. 1 in accordance with a preferred embodiment of the present invention.

FIG. 4 shows an example of logic used within status register 30 for double synchronization of an alarm bit. A first delay (D) flip-flop 91 and a second D flip-flop 92 are connected in series. The D input of D flip-flop 91 is connected to VDD through a line 94. The clock input of D flip-flop 91 receives from mask register 29 a masked alarm bit on a line 95. A clock input 97 of D flip-flop 92 receives a system clock (CLK) signal. The Q output of D flip-flop 92 places a status bit on line 98. The system clock (CLK) signal is used to clock all the synchronization blocks and register of secure assurance logic 12. A reset signal on a line 40, from synchronization block 31 (shown in FIG. 2), is used to reset D flip-flop 92. A logic NOR gate 93 is used to generate a reset for D flip-flop 91.

As shown in FIG. 2, a power-on-reset cell 27, a software reset placed on a line 42 and a reset (PINRST_L) line 43 all are used to reset the monitoring system. The reset signals are synchronized by a synchronization block 31, a synchronization block 32 and a synchronization block 33, connected as shown. A logic OR gate 34 and a logic OR gate 35 combine the reset signals to form the reset (RSROUT_L) on line 58. A hold reset block 36 holds the resets for a predetermined number of clock cycles and generates a reset delete (RSTDEL_L) signal on a reset delete line 59.

Figure 3:
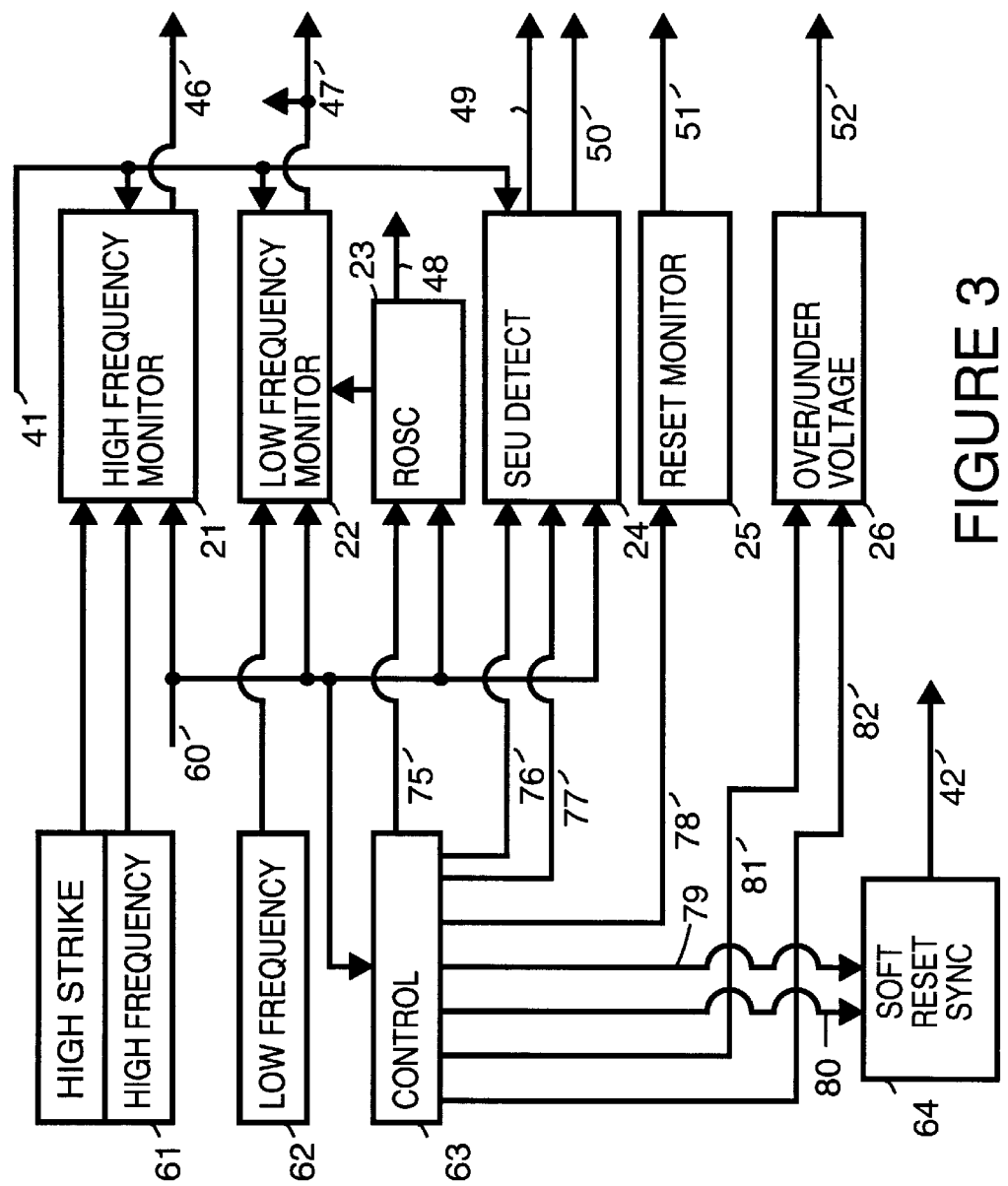
FIG. 3 is a simplified block diagram that shows additional secure assurance logic that links together electrical protection within an integrated circuit in accordance with a preferred embodiment of the present invention.

A soft reset synchronizer 64 (shown in FIG. 3) generates the software reset placed on line 42. Control register 63 (shown in FIG. 3) stores two control bits for soft reset synchronizer 64 that are forwarded to soft reset synchronizer 64 on a line 79 and a line 80.

Low frequency monitor 22 uses a reference clock that is generated by an internal ring oscillator (ROSC) 23 to make comparisons to the monitored clock signal (MON_CLK) on monitor clock signal line 41. Ring oscillator 23 must be used since low frequency monitor 22 needs to be able to detect when the monitored clock signal has stopped. Low frequency monitor 22 places a low frequency alarm on line 47.

Since the monitored clock is sampled, low frequency monitor 22 may produce a false error at any input clock frequency that violates the Nyquist rate. The monitored clock must be less than eight times the frequency of the reference clock generated by the ring oscillator. An eight-bit low frequency value stored in a register 62 (shown in FIG. 3) is used to configure low frequency monitor 22.

High frequency monitor 21 is used to ensure the monitored clock signal (MON_CLK) on monitor clock signal line 41 is below the maximum frequency of the device. Since high frequency monitor 21 uses the critical path of the device to determine if the clock frequency is too fast, the result is an operating point detection that includes monitoring the voltage, process, and temperature.

The high frequency limit is not fixed, but is determined by the capability of the device. In a system where there is a best case processed device at zero degrees with nominal voltage, the frequency of the device is allowed to be higher than when operation occurs at high temperature and lower voltage. Since the operating point is programmable, high frequency monitor 21 can be used to adjust a phased locked loop (PLL) frequency for the current operating environment. High frequency monitor 21 places a high frequency alarm on a line 46.

An eight-bit high strike value and an eight-bit high frequency value stored in a register 61 (shown in FIG. 3) are used to configure high frequency monitor 21.

Reset monitor 25 counts the number of resets (reset out signal (RSROUT_L) on reset out line 58) that are issued. Once the reset limit has been reached, reset monitor 25 issues an alarm on a line 51. Reset monitor 25 can be cleared using a clear strike bit in a control register 63 (shown in FIG. 3). Software is used to clear reset monitor 25 after completing the boot processing for the integrated circuit and waiting a random period of time.

The alarm from reset monitor 25 is used to issue a device reset (if unmasked in mask register 29). After reset, further manual resets (PINRST_L) issued on a line 43 are ignored until this alarm has been cleared in status register 30. Control register 63 (shown in FIG. 3) stores a clear bit for reset monitor 25 that is forwarded to reset monitor 25 on a line 78.

Over and under volt age detectors 26 are used to protect against a voltage level that is not valid for the process technology. The minimum operating core volt age and the maximum operating core voltage for the process are us ed as boundaries for the voltage detection.

The voltage ranges specified for the activation ranges of the detectors are based on the process technology in which the integrated circuit is implemented. Below the under voltage activation range, an under voltage error will always be detected. Above the power-on-reset (POR) activation range, power-on-reset cell 27 will always be inactive (not asserted). Above the over voltage detection (OVD) activation range, the over-voltage detector will generate an alarm. Below the over-voltage detector activation range, the over-voltage detector will not generate an alarm.

In many process technologies the under voltage activation range and the POR activation range overlap. In this case, the under voltage detector is not implemented (i.e., it is tied off in design). Whenever, the under voltage detector is not implemented, the POR activation range should be set based on the VDD−10% requirement instead of VDD minimum to ensure that the under voltage violations will cause a POR reset.

In the preferred embodiment the under voltage detection portion of over and under voltage detectors 26 monitors the core VDD voltage supply to ensure that the voltage level never drops below the minimum required core voltage for the given process. An error must not be detected when VDD is within the valid operating range of the device which is core VDD+/−10%.

In the preferred embodiment the under voltage detection portion of over and under voltage detectors 26 has a power down (PD) input 81 that can be used for IDDq testing. The output state of the device should not indicate an error when powered down regardless of the core VDD value. The under voltage design also rejects noise on the power supply line. The under voltage detection portion of over and under voltage detectors 26 is capable of being routed with the digital logic and does not cause errors due to digital switching noise.

The over voltage detection portion of over and under voltage detectors 26 monitors the core VDD supply to ensure that the voltage level never rises above the maximum allowed core voltage for the given process. Additionally, an error must not be detected when VDD is within the valid operating range of the device which is core VDD+/−10%.

The over voltage detection portion of over and under voltage detectors 26 also has a power down (PD) input 82 that can be used for IDDq testing. The output state does not indicate an error when powered down regardless of the core VDD value. The over voltage detection portion of over and under voltage detectors 26 is constructed in such a way to reject noise on the power supply line.

Single event upset (SEU) detect monitor 24 tracks the logic operation and detects single or multiple bit errors within 256 clock periods. In the preferred embodiment the detection logic is fully digital logic implemented within integrated circuit 11. When a single event upset is detected, single event upset detect monitor 24 places an alarm on alarm line 49 or alarm line 50. Control register 63 stores two error bits (r_err and p_err) for single event upset detect monitor 24 that are forwarded to single event upset detect monitor 24 on a line 76 and a line 77.

FIG. 1 shows use of single event upset detectors scattered throughout integrated circuit 11. Some of the single event upset detectors are placed near protected logic 112 (e.g., cryptographic logic) that is being protected. Additional single event upset detectors are placed as far away from the protected logic as possible to be used for comparison. The number of single event upset detectors used is determined by the overall gate count of the integrated circuit 11. A good rule of thumb is about one counter for every 15 k–20 k gates of cell based logic (do not include RAM or ROM in this calculation) in the design per logic block within integrated circuit 11.

The single event upset detectors are represented in FIG. 1 by a single event upset detector 114, a single event upset detector 115, a single event upset detector 116, a single event upset detector 117, a single event upset detector 118, a single event upset detector 119, a single event upset detector 120, a single event upset detector 121, and a single even upset detector 122. FIG. 1 is not drawn to scale. The single event upset detectors are scattered throughout secure integrated circuit 11 in order to detect events that occur even in seemingly non-critical areas of secure integrated circuit 11.

Single event upset detect monitor 24 (shown in FIG. 2) within secure assurance logic 12 collects single event upset detection information from single event upset detector 114 via a data path 124. Single event upset detect monitor 24 within secure assurance logic 12 collects single event upset detection information from single event upset detector 115 via a data path 125. Single event upset detect monitor 24 within secure assurance logic 12 collects single event upset detection information from single event upset detector 116 via a data path 126. Single event upset detect monitor 24 within secure assurance logic 12 collects single event upset detection information from single event upset detector 117 via a data path 127. Single event upset detect monitor 24 within secure assurance logic 12 collects single event upset detection information from single event upset detector 118 via a data path 128. Single event upset detect monitor 24 within secure assurance logic 12 collects single event upset detection information from single event upset detector 119 via a data path 129. Single event upset detect monitor 24 within secure assurance logic 12 collects single event up set detection information from single event upset detector 120 via a data path 130. Single event upset detect monitor 24 within secure assurance logic 12 collects single event upset detection information from single event upset detector 121 via a data path 131. Single event upset detect monitor 24 within secure assurance logic 12 collects single event upset detection information from single event upset detector 122 via a data path 132.

Each of single event upset detectors 114 through 122 uses digital logic to detect single event upsets. For example bit registers, each composed of a flip-flop, within single event upset detectors are monitored for a state transition due to single event upset . The flip-flops are utilized in a predetermined pattern and then are monitored for errors that occur during operation. An error in the state transition can indicate, for example, a single event upset caused by radiation, alpha particles or some other operation error.

A power-on-reset cell 27 provides a known state for the device when power is applied. Initializing to a known state is critical to a secure integrated circuit. Power-on-reset cell 27 uses the application of power to generate a reset output that is not released until the power has stabilized.

The integrity of power-on-reset cell 27 is imperative for the security of integrated circuit 11. Current test strategies require that all elements of an integrated circuit should be powered down into a low power state for IDDq testing. Since the initial state of any element on the device is only trusted when power-on-reset cell 27 is active, there is an external pin connected to a power down line 44 used to power down power-on-reset cell 27. The external pin cannot be trusted by secure assurance logic 12 such that it would bypass the power-on-reset cell 27 and result in an unknown state after power up.

Ring oscillator (ROSC) 23 provides the reference clock for low frequency monitor 22. In addition ring oscillator 23 provides an oscillator clock (OSC CLK) on an output line 48. The oscillator clock is used for active zeroization. Ring oscillator 23 is fully tested via scan test modes by breaking the ring oscillator chain and inserting flip-flops that make the chain observable and controllable.

The frequency value of the ring oscillator 23 can be tuned after layout using (OSC_CFG) input pins to tune which tap point is used for the end of the ring oscillator 23. These configuration inputs must be fixed for the final layout of the device. Control register 63 (shown in FIG. 3) stores a disable bit for ring oscillator 23 that is forwarded to ring oscillator 23 on a line 75.

Pin reset line (PINRST_L) 43 is the external reset from the input pad of the integrated circuit. Since the pin reset (PINRST_L) is controlled outside the integrated circuit, it cannot be trusted. The pin reset is assumed to be asynchronous by the integrated circuit. The external reset must be asserted for at least one clock cycle to ensure that synchronization logic 32 captures the reset. Synchronization logic 32 provides double synchronization for meta-stability. The pin reset (external reset) will not be propagated to the core as a reset for two clock periods when asserted.

Secure assurance logic 12 can be used to implement active zeroization in a security device. Secure assurance logic 12 supplies a guaranteed valid clock at all times by coupling the high and low frequency monitor. Whenever a high or low frequency error is detected, enabled and trapped, the switch clock (SWTICLK) signal is active on line 47. The SWTICLK signal can be used to multiplex the OSC_CLK signal on output line 48 with the system clock (prior to the clock tree). Since a device reset is issued based on the trapped violation, there is no requirement that this switch over be glitch free. Since the current clock may indeed be stopped, in the preferred embodiment this connection is made directly with a multiplexer. Once the switch over has occurred to the oscillator clock signal on output line 48, processor 123 (or other hardware logic) can make decisions about active zeroization based on the status register bits within status register 30 or the alarm output.

Figure 5:
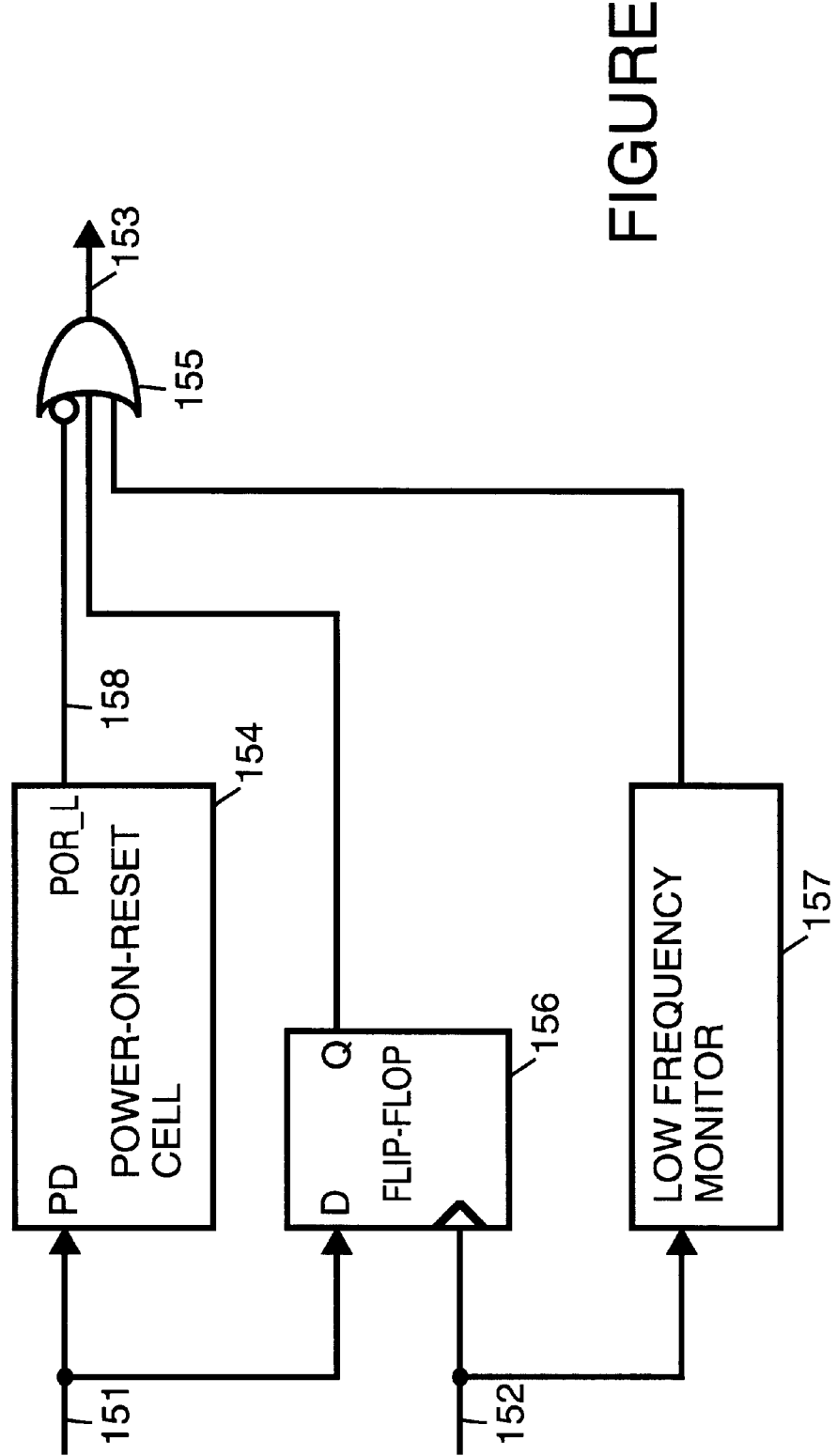
FIG. 5 is a simplified block diagram of power-on-reset logic in accordance with a preferred embodiment of the present invention.

FIG. 5 is a simplified block diagram which explains operation power-on-reset logic. A power-on-reset signal on a line 153 is generated by a power-on-reset cell 154 (equivalent to power-on-reset cell 27 shown in FIG. 1), a delay (D) flip-flop 156 (equivalent to sync 33 shown in FIG. 2) or a low frequency monitor 157 (equivalent to low frequency monitor 22 shown in FIG. 2). The reset signals are collected by a logic OR gate 155. A power down (PD) signal is placed on a line 151. D flip-flop 156 is clocked by the system clock (CLK) placed on a line 152. Low frequency monitor 157 monitors the frequency of the system clock (CLK).

When power is applied to integrated circuit 11, power-on reset cell 154 is powered down and integrated circuit 11 remains in a constant state (no reset is issued).

If an attacker were to attempt to bypass power-on-reset cell 154 by asserting the power down (PD) signal on line 151, D flip-flop 156 assures that the system clock (CLK) cannot be used without causing a reset of the integrated circuit. The reset causes integrated circuit 11 to be initialized to a known state. Low frequency monitor 157 prevents the system clock (CLK) from being stopped. That is, if the power down (PD) signal, generated by a power down pin connected to line 151, is asserted before integrated circuit 11 goes into a test mode (where low frequency monitor 157 is disable), then integrated circuit 11 will go into a reset state if the system clock (CLK) is stopped. The result is that power-on-reset logic 154 cannot be bypassed effectively.

Figure 6:
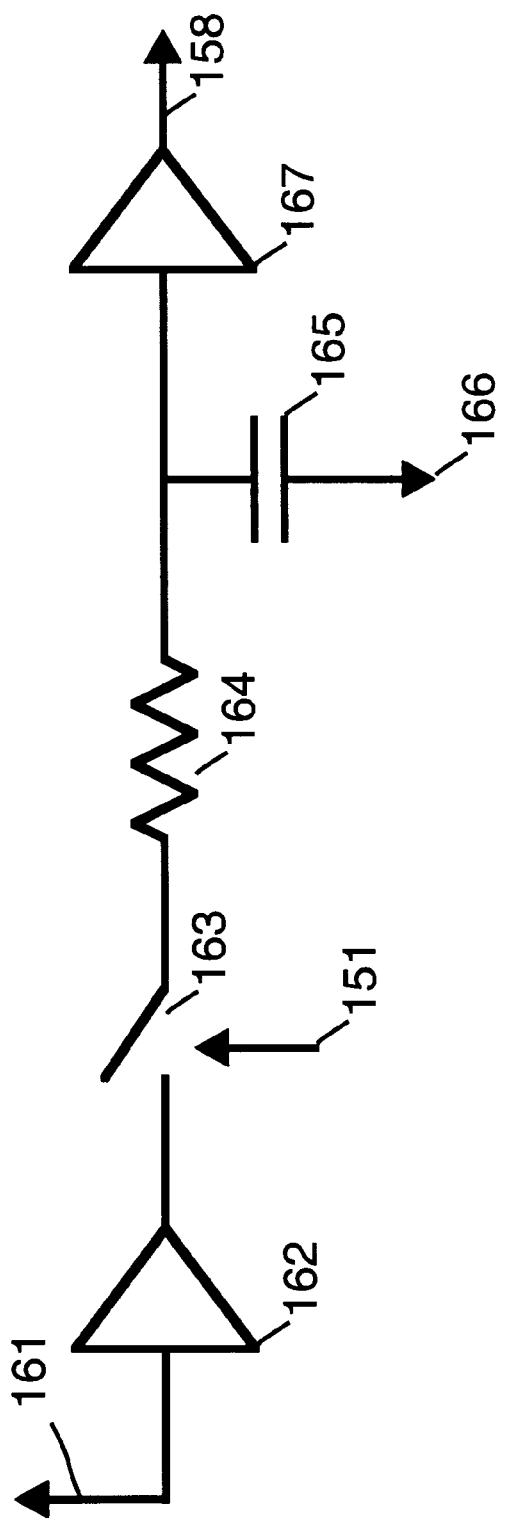
FIG. 6 is a simplified block diagram of a mode of a power-on-reset cell.

FIG. 6 is a simplified block diagram that models an implementation of power-on-reset cell 154. Power-on-reset cell 154 is implemented as a custom cell for a particular process technology. Power-on-reset cell 154 is constructed in such a way to reject noise on the power supply line.

A reset (POR_L) output 158 of power-on-reset cell 154 must stay low for a minimum of 20 microseconds after power has stabilized. The stabilized value of the power rail must be a voltage level that is greater than the implemented process technology minimum operating voltage.

Power down (PD) input 151 to power-on-reset cell 154 must not change the state of reset output 158. If power down input 151 is held high while power is applied, reset output 158 never releases the reset. If power down input 151 is asserted high after the power has been applied and the reset pulse has completed (greater than 20 microseconds after power is applied) then reset output 158 must remain high and not issue a reset.

FIG. 6 shows power-on-reset cell 154 modeled as an RC network consisting of a resistor 164 and a capacitor 165 connected to ground through line 166. VDD is placed on an input line 161. A buffer 162 forwards VDD to a switch 163 controlled by power down input 151. When power down input 151 is inactive (low) then capacitor 165 is allowed to charge. When the power down input 151 is asserted (high) capacitor 165 is not allowed to charge. Capacitor 165 is used to drive reset output 158 through a Schmitt trigger 167. Thus once capacitor 165 reaches the threshold (a time constant equal to 20 microseconds), the reset output 158 is released. While in FIG. 6, power-on-reset cell 154 is modeled as an RC network, actual implementation of the power-on-reset cell is dependent upon the technology utilized.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. An integrated circuit comprising:

secure logic that requires protection; and, secure assurance logic that protects the secure logic, the secure assurance logic including:

a plurality of protection modules for monitoring occurrence of insecure conditions, wherein the plurality of protection modules are interrelated such that each protection module monitors a different type of insecure condition, each protection module asserts an alarm signal when an associated insecure condition is detected, and a successful attack on the plurality of protection modules must simultaneously defeat at least two of the plurality of protection modules to gain access to the secure logic, and storing means for receiving and storing the alarm signals asserted by the plurality of protection modules.

2. An integrated circuit as in claim 1, wherein the storing means comprises:

a first register for receiving the alarm signals;

a second register for masking the alarm signals, the second register being used to prevent selected alarm signals from being propagated; and, a third register for storing alarm signals that have not been masked by the second register.

3. An integrated circuit as in claim 1, wherein the plurality of protection monitors includes a high frequency monitor that detects when a monitored clock exceeds a predetermined frequency.

4. An integrated circuit as in claim 1, wherein the plurality of protection monitors includes a low frequency monitor that detects when a monitored clock is less than a predetermined frequency.

5. An integrated circuit as in claim 1, wherein the plurality of protection monitors includes a single event detector monitor that monitors single event upsets within the integrated circuit.

6. An integrated circuit as in claim 1, wherein the plurality of protection monitors includes a reset monitor that monitors an amount of times the integrated circuit is reset.

7. An integrated circuit as in claim 1, wherein the plurality of protection monitors includes a voltage detector that monitors for invalid voltage levels.

8. An integrated circuit as in claim 1, wherein the secure assurance logic additionally comprises a power-on-reset circuit for resetting the integrated circuit to a known state upon power-up of the integrated circuit.

9. A method for protecting secure logic within an integrated circuit, the method comprising the following steps:
(a) monitoring, by a plurality of projection modules, occurrence of insecure conditions, the plurality of protection modules being interrelated such that each protection module monitors occurrence of a different type of insecure condition, and a successful attack on the plurality of protection modules must simultaneously defeat at least two of the plurality of protection modules to gain access to the secure logic, including the following substep:
  (a.1) asserting an alarm signal by a protection module from the plurality of protection modules, upon the protection module detecting an associated insecure condition; and,
(b) receiving and storing alarm signals asserted by the plurality of protection modules.

10. A method as in claim 9, wherein step (b) includes the following substeps:
  (b.1) receiving the alarm signals into a first register;
  (b.2) masking the alarm signals in accordance with values in a second register; and,
  (b.3) storing in a third register alarm signals that have not been masked in substep (b.3).

11. A method as in claim 10, additionally comprising the following step:
  (c) resetting the integrated circuit when an alarm signal is stored in the third register.

12. A method as in claim 9, wherein step (a) includes detecting when a monitored clock exceeds a predetermined frequency.

13. A method as in claim 9, wherein step (a) includes detecting when a monitored clock is less than a predetermined frequency.

14. A method as in claim 9, wherein step (a) includes detecting when single event upsets within the integrated circuit.

15. A method as in claim 9, wherein step (a) includes monitoring an amount of times the integrated circuit is reset.

16. A method as in claim 9, wherein step (a) includes monitoring for invalid voltage levels.

17. A method as in claim 9, additionally comprising the following step:
  (c) resetting the integrated circuit to a known state upon power-up of the integrated circuit.

18. Secure assurance logic within an integrated circuit, the secure assurance logic protecting secure logic, the secure assurance logic comprising:
  a plurality of protection modules for monitoring occurrence of insecure conditions, wherein the plurality of protection modules are interrelated such that each protection module monitors a different type of insecure condition, each protection module asserts an alarm signal when an associated insecure condition is detected, and a successful attack on the plurality of protection modules must simultaneously defeat at least two of the plurality of protection modules to gain access to the secure logic, and
  storing means for receiving and storing the alarm signals asserted by the plurality of protection modules.

19. Secure assurance logic as in claim 18, wherein the storing means comprises:
  a first register for receiving the alarm signals;
  a second register for masking the alarm signals, the second register being used to prevent selected alarm signals from being propagated; and,
  a third register for storing alarm signals that have not been masked by the second register.

20. Secure assurance logic as in claim 18, wherein the plurality of protection monitors includes at least one of the following:
  a high frequency monitor that detects when a monitored clock exceeds a predetermined frequency;
  a low frequency monitor that detects when a monitored clock is less than a predetermined frequency;
  a single event detector monitor that monitors single event upsets within the integrated circuit;
  a reset monitor that monitors an amount of times the integrated circuit is reset; and,
  a voltage detector that monitors for invalid voltage levels.

* * * * *